US011042837B2

(12) United States Patent
Mahalanobish (10) Patent No.: US 11,042,837 B2
(45) Date of Patent: Jun. 22, 2021

(54) SYSTEM AND METHOD FOR PREDICTING AVERAGE INVENTORY WITH NEW ITEMS

(71) Applicant: Walmart Apollo, LLC, Bentonville, AR (US)

(72) Inventor: Omker Mahalanobish, Santoshpur (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/569,888

(22) Filed: Sep. 13, 2019

(65) Prior Publication Data

US 2020/0090113 A1    Mar. 19, 2020

Related U.S. Application Data

(60) Provisional application No. 62/779,086, filed on Dec. 13, 2018.

(30) Foreign Application Priority Data

Sep. 14, 2018   (IN) .............................. 201811034765

(51) Int. Cl.
G06Q 30/02    (2012.01)
G06Q 10/08    (2012.01)
(Continued)

(52) U.S. Cl.
CPC ......... G06Q 10/087 (2013.01); G06Q 10/047 (2013.01); G06Q 20/203 (2013.01)

(58) Field of Classification Search
CPC ... G06Q 10/087; G06Q 10/047; G06Q 20/203
See application file for complete search history.

(56) References Cited

U.S. PATENT DOCUMENTS 6,592,033 B2    7/2003   Jennings et al.
9,483,741 B2    11/2016  Sun et al.
(Continued)

FOREIGN PATENT DOCUMENTS

WO           03042793 A2    5/2003

OTHER PUBLICATIONS

International Search Report and Written Opinion dated Nov. 19, 2019 in corresponding International Application No. PCT/US2019/051047, 19 pages.

(Continued)

*Primary Examiner* — Talia F Crawley
(74) *Attorney, Agent, or Firm* — Duane Morris LLP; Manita Rawat (57) ABSTRACT

An example method for predicting average inventory with newly added items can include: aggregating sales data of a plurality of items, the items comprising training items and new items; identifying, using a set of predefined rules, a data set of similar items on the training items for each of the new items, the set of predefined rules comprising a first stage similarity module, a second stage similarity module, and a second stage classification module; obtaining target metrics for each of the new items, the target metrics being turn predictions from the data set of the similar items; calculating mean errors of the turn predictions to identify a set of turn predictions with mean errors lower than a dynamic threshold; obtaining an ultimate turn prediction for each new item by averaging the set of turn predictions; and predicting an average inventory for each new item based on the ultimate turn prediction.

20 Claims, 3 Drawing Sheets

(51) Int. Cl.
   *G06Q 10/06* (2012.01)
   *G06Q 10/04* (2012.01)
   *G06Q 20/20* (2012.01)

(56) References Cited

U.S. PATENT DOCUMENTS

| | | | | |
|---|---|---|---|---|
| 10,546,269 | B1* | 1/2020 | Gaurav | G06Q 10/087 |
| 2004/0260600 | A1* | 12/2004 | Gross | G06Q 30/02 |
| | | | | 705/7.31 |
| 2010/0268661 | A1 | 10/2010 | Levy et al. | |
| 2013/0006801 | A1 | 1/2013 | Solari et al. | |
| 2013/0080423 | A1* | 3/2013 | Parikh | G06F 16/242 |
| | | | | 707/722 |
| 2014/0039979 | A1* | 2/2014 | Zhang | G06Q 30/0202 |
| | | | | 705/7.31 |
| 2014/0365343 | A1* | 12/2014 | Peters | G06Q 10/087 |
| | | | | 705/28 |
| 2015/0032502 | A1* | 1/2015 | Green | G06Q 30/0201 |
| | | | | 705/7.29 |
| 2015/0278849 | A1* | 10/2015 | Reichert | G06Q 30/0268 |
| | | | | 705/14.41 |
| 2016/0203431 | A1* | 7/2016 | Renfroe | G06Q 10/087 |
| | | | | 705/7.25 |
| 2018/0005173 | A1* | 1/2018 | Elazary | G06Q 10/087 |
| 2018/0204267 | A1* | 7/2018 | Licht | G06Q 30/0635 |
| 2018/0253711 | A1* | 9/2018 | Suzuki | G06Q 20/202 |
| 2018/0315059 | A1* | 11/2018 | Venkatesh | G06Q 10/06375 |
| 2019/0188536 | A1* | 6/2019 | Lei | G06K 9/03 |
| 2019/0213212 | A1* | 7/2019 | Adato | G06F 16/23 |
| 2019/0213390 | A1* | 7/2019 | Adato | G06F 16/23 |
| 2019/0213660 | A1* | 7/2019 | Astrada | G06F 16/9535 |
| 2020/0013000 | A1* | 1/2020 | Wicker | H04L 67/1002 |
| 2020/0219042 | A1* | 7/2020 | Gaurav | G06Q 10/087 |

OTHER PUBLICATIONS

Ferreira, K. J. et al., "Analytics for an Online Retailer: Demand Forecasting and Price Optimization", Manufacturing & Service Operations Management, vol. 18, No. 1, Nov. 13, 2015, 42 pages.
Bodenstab, J. "Demand Forecasting for New Product Introductions" toolsgroup, Nov. 29, 2016, 1 page.
Jill, "Ultimate Guide to Inventor Forecasting", Inventory Planner, Aug. 9, 2018, 11 pages.
Bhavin Parikh, "Applying Data Mining to Demand Forecasting and Product Allocations", Nov. 2003, pp. 1-42.
Florian Carra, "Recommender System for Retail Industry", 2015, pp. 1-76.
Tavish Srivastava, "Introduction to k-Nearest Neighbors: Simplified (with implementation in Python)", Mar. 26, 2018, pp. 1-26.
Adi Bronshtein, "A Quick Introduction to K-Nearest Neighbors Algorithm", Apr. 11, 2017, pp. 1-7.
Riswana P. P. et al., "Mining Top K-HUI Patterns by using RUC Strategy", International Journal of Computer Science Trends and Technology (IJCST), vol. 5, Issue 2, Mar.-Apr. 2017. pp. 449-452.
Manish Joshi et al., Clustering-Based Stability and Seasonality Analysis for Optimal Inventory Prediction, 2014, pp. 1-3.

* cited by examiner

SYSTEM AND METHOD FOR PREDICTING AVERAGE INVENTORY WITH NEW ITEMS

CROSS-REFERENCE TO RELATED APPLICATIONS

This patent application claims the priority to Indian Provisional Patent Application No.: 201811034765, filed Sep. 14, 2018, and U.S. Provisional Application No. 62/779,086, filed Dec. 13, 2018, contents of which are incorporated by reference herein.

BACKGROUND

1. Technical Field

The present disclosure relates to inventory control, and more specifically to systems and methods for predicting average inventory with newly added items.

2. Introduction

New items are continuously introduced into a market almost every day. Before the new items are selected and included as a part of the store assortment in an inventory of retail stores, it is highly important to identify and manage an inventory for each of the new items, mainly to meet a budget and assortment constraints.

There is a need to conduct an inventory prediction and assortment selection for the new items and to determine when and how many new items can be added into the product assortment in order to satisfy demand of customers. Inventory prediction and management may result in a perfect sale opportunity for each of the new items, thereby reducing inventory costs.

SUMMARY

An example computer-implemented method of performing concepts disclosed herein can include: aggregating, by a processor of a computing device, sales data of a plurality of items in a category from a database, the items comprising training items and new items, the sales data of each of the items comprising attributes and an item-based Point-of-Sale (PoS) data; identifying, by the processor using a set of predefined rules, a data set of similar items on the training items for each of the new items, the set of predefined rules comprising a first stage similarity module, a second stage similarity module, and a second stage classification module; obtaining target metrics for each of the new items, the target metrics being turn predictions from the data set of the similar items; calculating mean errors of the turn predictions to identify a set of turn predictions with mean errors lower than a dynamic threshold; obtaining an ultimate turn prediction for each of the new items by averaging the set of turn predictions; and predicting an average inventory for each of the new item based on the ultimate turn prediction.

A system for predicting average inventory with newly added items, the system comprising: a processor; and a non-transitory computer-readable storage medium having instructions stored which, when executed by the processor, cause the processor to perform operations comprising: aggregating, by a processor of a computing device, sales data of a plurality of items in a category from a database, the items comprising training items and new items, the sales data of each of the items comprising attributes and an item-based Point-of-Sale (PoS) data; identifying, by the processor using a set of predefined rules, a data set of similar items on the training items for each of the new items, the set of predefined rules comprising a first stage similarity module, a second stage similarity module, and a second stage classification module; obtaining target metrics for each of the new items, the target metrics being turn predictions from the data set of the similar items; calculating mean errors of the turn predictions to identify a set of turn predictions with mean errors lower than a dynamic threshold; obtaining an ultimate turn prediction for each of the new items by averaging the set of turn predictions; and predicting an average inventory for each of the new item based on the ultimate turn prediction.

A non-transitory computer-readable storage medium having instructions stored which, when executed by a computing device, cause the computing device to perform operations including: aggregating, by a processor of a computing device, sales data of a plurality of items in a category from a database, the items comprising training items and new items, the sales data of each of the items comprising attributes and an item-based Point-of-Sale (PoS) data; identifying, by the processor using a set of predefined rules, a data set of similar items on the training items for each of the new items, the set of predefined rules comprising a first stage similarity module, a second stage similarity module, and a second stage classification module; obtaining target metrics for each of the new items, the target metrics being turn predictions from the data set of the similar items; calculating mean errors of the turn predictions to identify a set of turn predictions with mean errors lower than a dynamic threshold; obtaining an ultimate turn prediction for each of the new items by averaging the set of turn predictions; and predicting an average inventory for each of the new item based on the ultimate turn prediction.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to systems and methods of predicting an average inventory with newly added new items in order to obtain an optimal and efficient inventory assortment and maximize retail sales. As described in greater detail below, the system uses machine learning algorithms such as K-Nearest Neighbors (KNN) for data classification.

Generally, an item assortment selection process involves in the use of a turn rate. The turn rate or value for an item is defined as a ratio of the item sales amount to the item average inventory. The item sales amount is a multiplication of the average unit price and the Units sold Per Store Per Week (UPSPW) for an item over a comparative time frame. An average inventory for an item is defined as the average on hand inventory in retail dollars, at the stores of interest over a comparative time frame.

In some embodiments, a data set of similar items is obtained after running different modules or methods described below. A target metric is defined as a metric which can be predicted from the obtained data set of the similar items. Turn and inverse turn are two different target metrics and are considered in the systems and methods described herein.

In the systems of the present disclosure, it is assumed that the similar items in a category may have similar turns. Thus, a problem of conducting assortment selection for new items and obtaining inventory prediction can be solved by identifying a set of most similar items for each of the new items.

Figure 1:
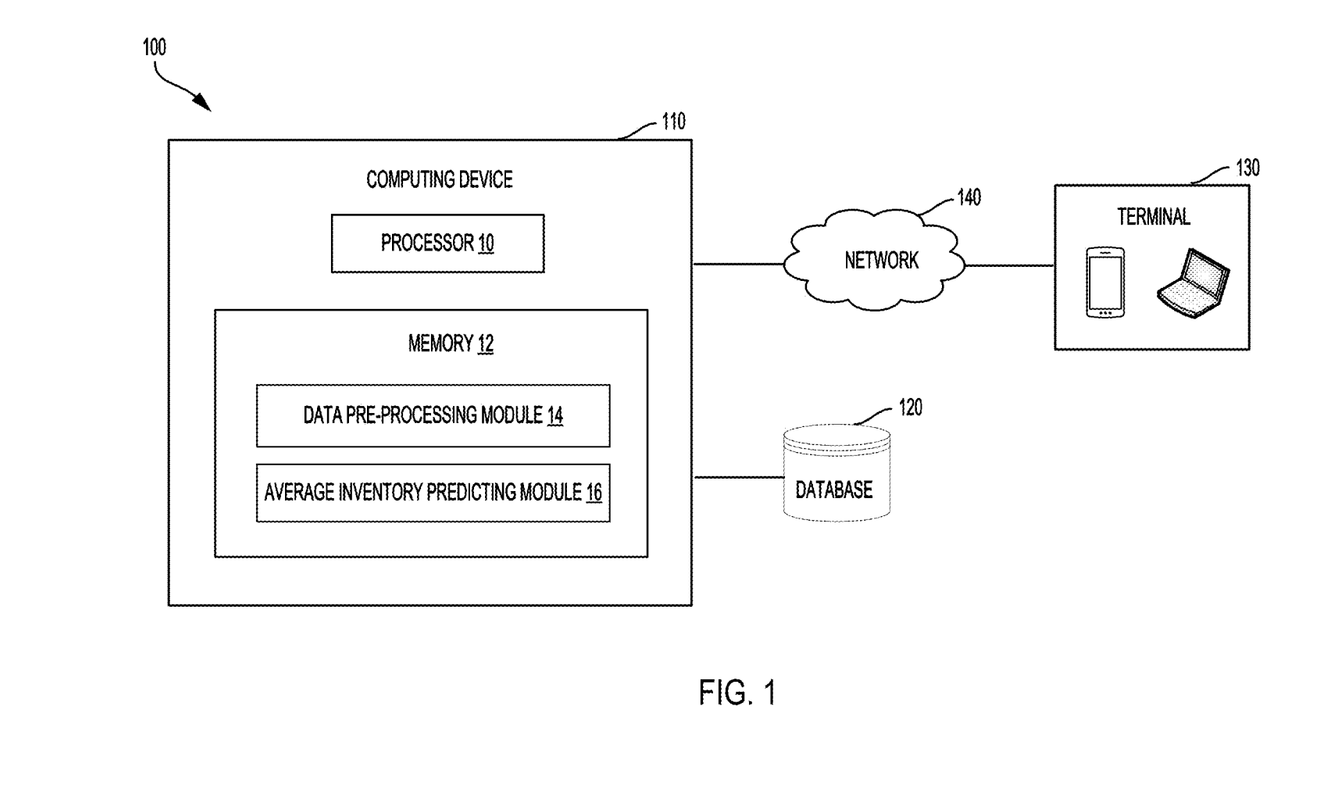
FIG. 1 is a block diagram illustrating an example computing system in accordance with some embodiments of the present invention.

FIG. 1 is a block diagram illustrating an example computing system 100 in which some example embodiments may be implemented. The example computing system 100 generally includes a computing device 110, a database 120, a terminal 130, and network 140.

The computing device 110 may be a server or a computer terminal associated with a retailer. The computing device 110 may include processor 10 and memory 12. The memory 12 may store various modules or executed instructions/applications to be executed by the processor 10. In some embodiments, the system may include a data pre-processing module 14 and an average inventory predicting module 16.

The computing device 110 communicates with the database 120 to execute one or more sets of processes. The database 120 may be communicatively coupled to the computing device 110 to receive instructions or data from and send data to the computing device 110 via network 140.

The database 120 may store customer transaction history which includes all purchased records in retail stores during a period of time (e.g., a day/week/month/year). The database 120 may store data associated with existing items, new items and added items. Existing items are present in stores across a training period and a validation period. New items are present in the training period as well as the validation period. In some cases, performance of the new items has increased manifold in the validation period as compared to the training period. The set of the new items are considered as a proxy of new items. Added items are referred to as items newly added in the validation period, but are not present in the training period.

The terminal 130 may represent at least one of a portable device, a tablet computer, a notebook computer, or a desktop computer that allows a category manager or customer to communicate with the computing device 110 to perform online activities via network 140.

The network 140 may include a satellite-based navigation system or a terrestrial wireless network, Wi-Fi, and other type of wired or wireless networks to facilitate communications between the various networks devices associated with the example computing system 100.

In some embodiments, the data pre-processing module 14 is configured to acquire and preprocess the data required by the average inventory predicting module 16. The data pre-processing module 14 can obtain the retailer's transaction sales data, especially the item-based transaction history at Point-of-Sale (PoS) devices in a retail store.

The item-based PoS history or data records may include item data associated with units, price, and inventory, etc. The data may be associated with sales data of items (e.g., products) in a category in a given period (day/week/month/year). All records associated with the items may include item attributes, such as brand, fineline, dimension, item type, pack size, etc. The descriptions of multiple items are grouped together to form a fineline description. Each item may be characterized by a unique set of attributes. The item attributes differ from item to item. For example, the brand attribute may have different values for each of the items in the same category. The items may be present in the retail stores during a training period or a validation period. The training period may be 1 year pre mod drop. Other time frames may also be used. The validation period may be 26 weeks post mod drop.

The system may take a plurality of approaches to find the similar items for each new item, for example, using KNN algorithm and Gower's distance measures. For the similar items, the system may use aggregation techniques to predict two different target metrics, such as a turn and an inverse turn, based on the similar items. Further, the system may obtain the predicted value of an average inventory with newly added items using the predicted target metrics.

In some embodiments, the system may use 3 different modules or methods for data classification to identify similar items, including:

1) a first stage similarity module with K-Nearest Neighbors algorithm;

2) a second stage similarity module with K-Nearest Neighbors algorithm; and 3) a second stage classification module with K-Nearest Neighbors algorithm.

A First Stage Similarity Module with K-Nearest Neighbor Method and Gower's Distance A first stage or simple Similarity Module for the new items is performed using the K-Nearest Neighbor and Gower's distance. K-Nearest Neighbor analysis is performed on each of the new items and a data set of training items using the attributes as well as POS data of the items. The data set of the training items may include the existing items in a category.

The distance metric considered is the Gower's distance (a measure of dissimilarity). Gower's distance may be calculated for each of the new items with the data set of the training items with regard to mixed type variables, such as nominal and continuous variables. The mixed type variables may be associated with different attributes as well as POS data of the items. The KNN algorithm will search through the data set of the training items for the K-most similar instances. For example, when K is chosen to be 20, the module definition can be modified to obtain the K % of most nearest items to each of the new items. The process does not depend on the size of the category under consideration.

The first stage modification using the K-Nearest Neighbor algorithm may also be included and applied to the following two methods. The following two methods using the K-Nearest Neighbor algorithm with additional processes may be used to restrict a size of similar items obtained and to generate a more meaningful and diminished data set of similar items for each new item.

A Second Stage Similarity Module with K-Nearest Neighbor Method

First, the 50-Nearest Neighbor algorithm is performed for each of the new items, using only the attribute information. Second, another 30-Nearest Neighbor is run to further filter down the data set of similar items by using the related POS data. Thus, a set of much reduced and most similar items is obtained for each new item.

A Second Stage Classification Module with K-Nearest Neighbor Method

In some embodiments, a plurality of simulations are performed in the second stage classification. Each simulation may be conducted with the following example steps.
1) Randomly choose 50% of the new items.
2) For each of the new items, the 30-Nearest Neighbor algorithm is run using both the attributes as well as POS data, to identify the similar items.
3) New metrics are introduced for each of the similar items, based on their UPSPW, store count and price in the pre period as compared to the post period.
4) Using the data set of predicted similar items, the new item's turn value can be predicted and compared to its observed turn. The error in turn prediction can be obtained for each of the new items chosen in the simulation.
5) After each simulation, for each new item, the data set of similar items is stored along with their comparison metrics and the error in turn prediction.

The metric associated with the error in turn prediction can be Symmetric Mean Absolute Percentage Error (SMAPE). The turn for each of the new items in the post period is calculated based on the module. A SMAPE is calculated based on the relative difference of the predicted turn compared with the observed turn.

After a number of simulations are performed, for example, 200 simulations, a decision tree is created on the comparison metrics of the similar items. The decision tree is basically used to filter out those similar items which may potentially lead to an erroneous prediction.

Finally, another 30-nearest neighbor algorithm may be performed on the entire data set of new items. For each new item, the obtained decision tree is used to discard those similar items which may potentially pull the predicted turn away from the observed turn. The system may update and obtain a much reduced and reliable data set of the similar items.

Aggregation Techniques

Once the data set of similar items is obtained for a given new item, for example as described above, the target metric of each of them is considered to come up with one value of the target metric as a turn prediction. In some embodiments, weighted mean and linear regression are aggregation techniques used for predicting the target metric.

1. Weighted Mean

For each new item, a weighted mean of the target metric is considered for the data set of similar items and similarity scores of the similar items are considered as weights. The similarity scores are obtained from the K-nearest neighbor algorithm with Gower's distance, based on their relative nearness. The similarity scores between the similar items and each of the new items are aggregated and the weighted mean of the similarity scores is calculated to obtain one predicted value of the target metric.

2. Linear Regression

For each item, a linear regression algorithm can be fitted on the data set of similar items where the target metric is a dependent variable and the POS data is the predictors (e.g., predictor variable or independent variable). Using the fitted linear regression, the target metric can be easily predicted for the new item.

Final Choice of Approaches

For a given category, once all approaches, in this example (e.g., 3 methods*2 target metrics*2 aggregation techniques) are performed, the mean error of prediction is calculated for each of the approaches. More or less of the possible number of approaches may also be used.

In some embodiments, the system may calculate and obtain mean errors in turn predictions from all the different modules. The system may calculate mean errors of the predictions to identify the approaches with a set of turn predictions in which mean errors are lower than a dynamic threshold. For example, the dynamic threshold can be predefined as 1.2 times of a minimum of the mean errors of the turn predictions.

Finally, the identified approach(s) can be performed on the data set of newly added items and an average inventory of the prediction is considered as the ultimate prediction.

From Target Metric to Inventory

The turn may be a direct and logical metric. In some embodiments, it is assumed that similar items have similar turns. The inverse turn can be logically extended to any one-to-one function of turn. Further, it can be noticed that very low and very high turns for items usually indicate erroneous turn predictions. Thus, the inverse turn is considered to expand the range of very low turn and at the same time diminishes the range of very high turns.

The average inventory (represented by avg inventory) can be obtained by using the target metric turn based on the following equations. The average price (e.g., avg price) represents the average price per unit.

The turn and average inventory are defined with equations (1) and (2).

$$\text{turn} = \frac{\text{avg price} * UPSPW}{\text{avg inventory}} \tag{1}$$

$$\text{avg inventory} = \frac{\text{avg price} * UPSPW}{\text{turn}} \tag{2}$$

Similarly, the inverse turn and average inventory (avg inventory) can be defined with equations (3) and (4).

$$\text{Inverse turn} = \frac{\text{avg inventory}}{\text{avg price} * UPSPW} \tag{3}$$

$$\text{avg inventory} = \text{inverse turn} * \text{avg price} * UPSPW \tag{4}$$

In some embodiments, a predicted value of the average inventory with newly added items can be obtained by using the turns and inverse turns of the similar items. If the target metrics of the turns and inverse turns are predicted, the predicted value of the average inventory can be easily obtained.

Obtaining Confidence Metric

In some embodiments, a value of confidence may be required to evaluate the turn prediction for each item. The confidence of the turn prediction may be independent of the predicted value of average inventory of its own as well as of other items. A decision tree may be used for the same purpose.

For a given category, once all of 12 approaches (3 methods*2 target metrics*2 aggregation techniques) are performed, the system can access the predicted average inventory which are obtained for each new item using each of the 12 approaches.

Additionally, the system includes information of a magnitude of the error in prediction in each of scenarios (e.g., approaches). The predictions with less than 30% error may be tagged as 'High Confidence'. The predictions with more than 50% error may be tagged as 'Low Confidence'. The rest of the predictions may be tagged as 'Medium Confidence'.

A decision tree can be set up with the tagged information as classes, and variables such as UPSPW, store count, brand share, fineline share and price as explanatory variables. The decision tree may consider inherent category information about the items, such as average price, variance of price, number of existing items, number of new items, category share in a department, etc. The decision tree is trained on the category information and the module that yields minimum error for the same. For every new item in the same category, the decision tree can predict which module provides the least error for the new item, based on the same category information associated with the similar items. This decision tree may be used to obtain the confidence in the prediction for each of the newly added items, which is totally independent of an item's own predicted value of average inventory as well as that of the other items.

Obtaining Estimated Impact

In some embodiments, the system includes a Heuristic baseline module. The Heuristic baseline module can be used for obtaining the average inventory of new items. The Heuristic baseline module may be used to obtain the following data sets, including:

1) a first mean average inventory of existing items having same brand;
2) a second mean average inventory of existing items having same fineline; and
3) an average of the first mean average inventory and the second mean average inventory.

In some embodiments, the data set obtained by the Heuristic baseline module is considered as a baseline or comparison point. For example, the Heuristic baseline module is used to obtain the average UPSPW of all the items having the same fineline that a new item belongs to. With the turn prediction, the UPSPW and an average price of the new item, the average inventory of the new item can be obtained based on the equation (2).

Figure 2:
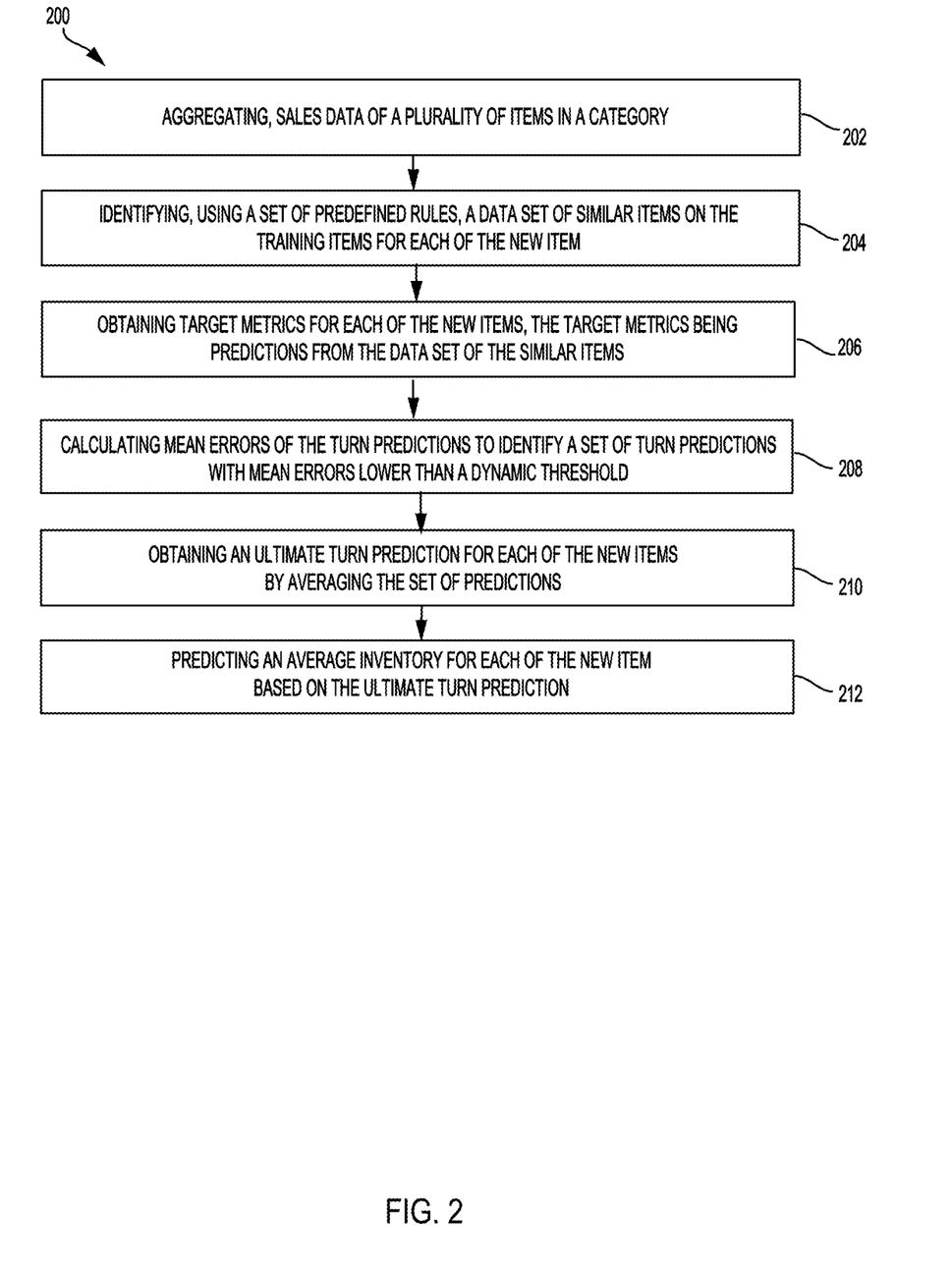
FIG. 2 is a flowchart diagram illustrating an example process for predicting an average inventory with new items in accordance with some embodiments.

FIG. 2 is a flowchart diagram illustrating an example process 200 for predicting an average inventory with new items in accordance with some embodiments.

The process 200 may be implemented in the above described systems and may include the following steps. Steps may be omitted or combined depending on the operations being performed.

In step 202, the data pre-processing module 14 may aggregate sales data of a plurality of items in a category during a given period. The items may include training items and new items newly added into the inventory. The sales data of each of the items include attributes and an item-based PoS data;

In step 204, the system may use a set of predefined rules to identify a data set of similar items on the training items for each of the new items. The set of predefined rules includes a first stage similarity module, a second stage similarity module, and a second stage classification module. The data set of the similar items may include variables associated with each of similar items, such as turn, inverse turn, UPSPW, average inventory, average price, POS data, store count, attributes, brand share, fineline share, price, variance of price, category share in a department, etc. In step 206, the system may obtain target metrics for each of the new items. The similar items in a category may have similar turns. The target metrics for a new item are considered as turn predictions from the data set of the similar items.

In step 208, the processor may be configured to calculate mean errors of the turn predictions to identify a set of turn predictions with mean errors lower than a dynamic threshold. For example, the system can identify the approach(s) with mean error less than 1.2 times the minimum mean error of turn prediction.

In step 210, the processor may be configured to obtain an ultimate turn prediction for each of the new items by averaging the set of turn predictions.

In step 212, the system may predict an average inventory for each of the new item based on the ultimate turn prediction.

Figure 3:
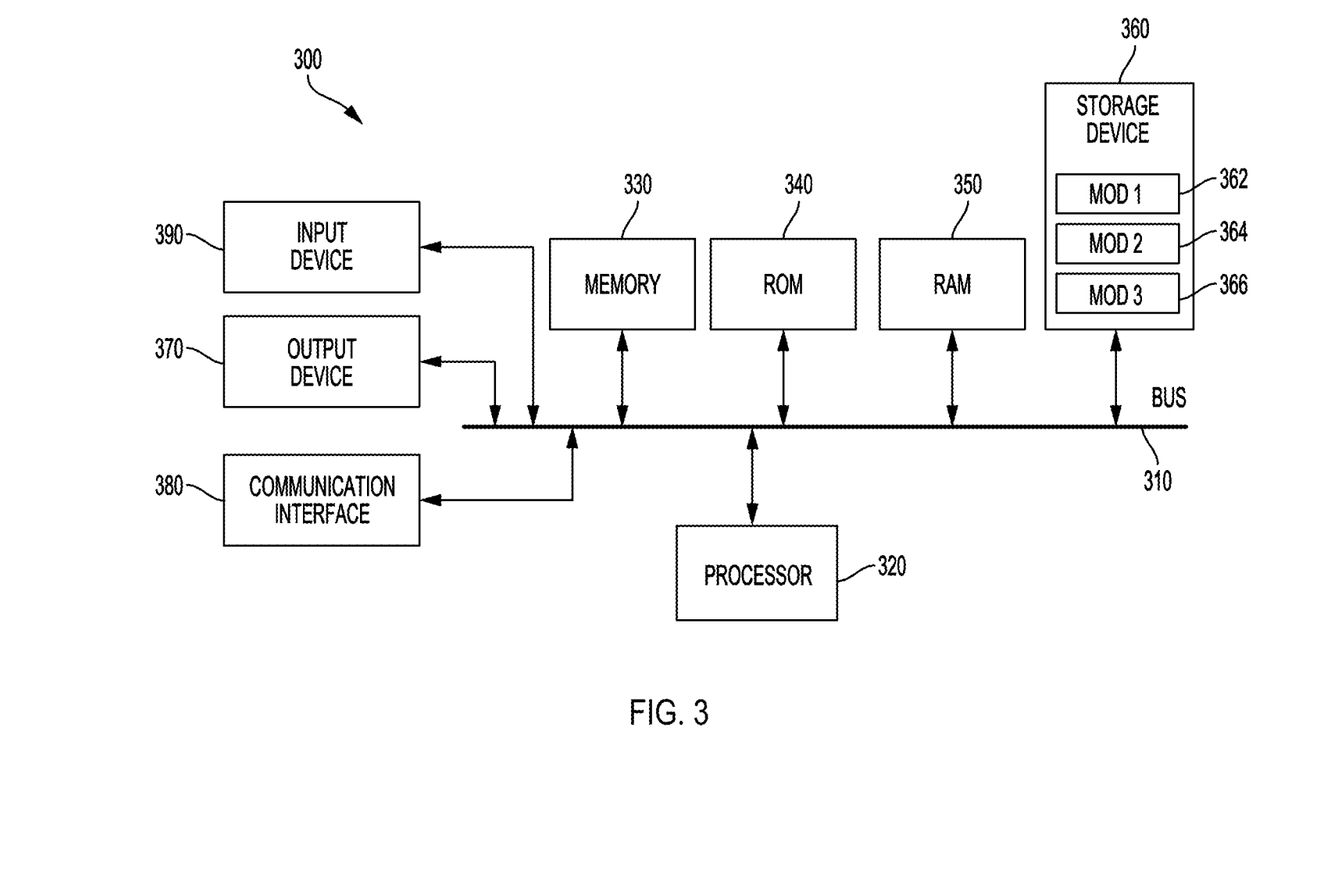
FIG. 3 is a block diagram an example computer system in which some example embodiments may be implemented.

FIG. 3 illustrates an example computer system 300, which may be used to implement embodiments as disclosed herein. The computing system 300 may be a server, a personal computer (PC), or another type of computing device.

The exemplary system 300 can include a processing unit (CPU or processor) 320 and a system bus 310 that couples various system components including the system memory 330 such as read only memory (ROM) 340 and random access memory (RAM) 350 to the processor 320. The system 300 can include a cache of high speed memory connected directly with, in close proximity to, or integrated as part of the processor 320. The system 300 copies data from the memory 330 and/or the storage device 360 to the cache for quick access by the processor 320. In this way, the cache provides a performance boost that avoids processor 320 delays while waiting for data. These and other modules can control or be configured to control the processor 320 to perform various actions. Other system memory 330 may be available for use as well. The memory 330 can include multiple different types of memory with different performance characteristics. It can be appreciated that the disclosure may operate on a computing device 300 with more than one processor 320 or on a group or cluster of computing devices networked together to provide greater processing capability. The processor 320 can include any general purpose processor and a hardware module or software module, such as module 1 362, module 2 364, and module 3 366 stored in storage device 360, configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output (BIOS) stored in ROM 340 or the like, may provide the basic routine that helps to transfer information between elements within the computing device 300, such as during start-up. The computing device 300 further includes storage devices 360 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drives and the associated computer-readable storage media provide nonvolatile storage of computer-readable instructions, data structures, program modules and other data for the computing device 300. In one aspect, a hardware module that performs a particular function includes the software component stored in a tangible computer-readable storage medium in connection with the necessary hardware components, such as the processor 320, bus 310, display 370, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 300 is a small, handheld computing device, a desktop computer, or a computer server.

Although the exemplary embodiment described herein employs the hard disk 360, other types of computer-readable media which can store data that are accessible by a computer, such as magnetic cassettes, flash memory cards, digital versatile disks, cartridges, random access memories (RAMs) 350, and read only memory (ROM) 340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can also be one or more of a number of output mechanisms known to those of skill in the art. In some instances, multimodal systems enable a user to provide multiple types of input to communicate with the computing device 300. The communications interface 380 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method, comprising:
   aggregating, by a processor of a computing device, sales data of a plurality of items in a category from a database, the items comprising training items and new items, the sales data of each of the items comprising attributes and an item-based Point-of-Sale (PoS) data;
   identifying, by the processor using a set of predefined rules, a data set of similar items from the training items for each of the new items, the set of predefined rules comprising:
      a first stage similarity module which performs a K-Nearest Neighbors algorithm on the training items using the attributes and the PoS data, resulting in first-stage nearest items;
      a second stage similarity module which performs, after the first stage similarity module:
         a 50-Nearest Neighbors algorithm for each item in the first-stage nearest items using the attributes, resulting in attribute-filtered nearest items; and
         a 30-Nearest Neighbors algorithm for each item in the attribute-filtered nearest items using the PoS data, resulting in attribute and PoS filtered nearest items; and
      a second stage classification module which executes a plurality of simulations on the attribute and PoS filtered nearest items resulting in the data set of similar items, wherein the plurality of simulations comprise performing the 30-Nearest Neighbors algorithm for each of the new items using both the attributes and the POS data;
   obtaining target metrics for each of the new items, the target metrics being turn predictions from the data set of the similar items;
   calculating mean errors of the turn predictions to identify a set of turn predictions with mean errors lower than a dynamic threshold;
   obtaining an ultimate turn prediction for each of the new items by averaging the set of turn predictions; and
   predicting an average inventory for each of the new item based on the ultimate turn prediction.

2. The method of claim 1, wherein the identifying the similar items using the second stage classification module further comprises:
   randomly choose 50% of the new items;
   performing the 30-Nearest Neighbors algorithm for each of the randomly chosen new items using both the attributes and the POS data to identify the similar items;
   predicting a turn value for each of the new items based on a data set of identified similar items;
   comparing the turn value with an observed turn to obtain an error in a turn prediction for each of the new items; and
   storing the data set of the similar items, their comparison turn values, and the error in turn prediction.

3. The method of claim 2, further comprising:
   creating a decision tree based on comparisons of turn values of the similar items by iterating a number of simulations;
   filtering out the similar items which lead to an erroneous prediction;
   performing a 30-Nearest Neighbors algorithm on an entire data set of the new items; and
   updating the similar items based on the decision tree.

4. The method of claim 1, wherein the obtaining the target metrics for each of the new items further comprises calculating a weight mean of similarities on the data set of the similar items.

5. The method of claim 1, wherein the turn predictions of the target metrics are obtained by performing linear regression on the data set of the similar items, and wherein the target metrics are dependent variables and the item-based PoS data are predictors.

6. The method of claim 1, wherein the dynamic threshold is 1.2 times of a minimum of the mean errors of the predictions.

7. The method of claim 1, wherein the set of predefined rules comprises Gower's distance measures.

8. A system for predicting a stock on hand for predefined markdown plans, comprising:
a processor; and
a non-transitory computer-readable storage medium having instructions stored which, when executed by the processor, cause the processor to perform operations comprising:
aggregating, by a processor of a computing device, sales data of a plurality of items in a category from a database, the items comprising training items and new items, and the sales data of each of the items comprising attributes and an item-based Point-of-Sale (PoS) data;
identifying, by the processor using a set of predefined rules, a data set of similar items on the training items for each of the new items, the set of predefined rules comprising:
a first stage similarity module which performs a K-Nearest Neighbors algorithm on the training items using the attributes and the PoS data, resulting in first-stage nearest items;
a second stage similarity module which performs, after the first stage similarity module:
a 50-Nearest Neighbors algorithm for each item in the first-stage nearest items using the attributes, resulting in attribute-filtered nearest items; and
a 30-Nearest Neighbors algorithm for each item in the attribute-filtered nearest items using the PoS data, resulting in attribute and PoS filtered nearest items; and
a second stage classification module which executes a plurality of simulations on the attribute and PoS filtered nearest items resulting in the data set of similar items, wherein the plurality of simulations comprise performing the 30-Nearest Neighbors algorithm for each of the new items using both the attributes and the POS data;
obtaining target metrics for each of the new items, the target metrics being turn predictions from the data set of the similar items;
calculating mean errors of the turn predictions to identify a set of turn predictions with mean errors lower than a dynamic threshold;
obtaining an ultimate turn prediction for each of the new items by averaging the set of turn predictions; and
predicting an average inventory for each of the new items based on the ultimate turn prediction.

9. The system of claim 8, wherein the identifying of the data set of the similar items using the second stage classification module further comprises:
randomly choose 50% of the new items;
performing the 30-Nearest Neighbors algorithm for each of the randomly chosen new items using both the attributes and the POS data to identify the similar items;
predicting a turn value for each of the new items based on a data set of identified similar items;

comparing the turn value with an observed turn to obtain an error in a turn prediction for each of the new items; and
storing the data set of the similar items, their comparison turn values, and the error in turn prediction.

10. The system of claim 9, wherein the identifying the similar items using the second stage classification module further comprises:
creating a decision tree based on comparisons of turn values of the similar items by iterating 200 simulations;
filtering out the similar items which lead to an erroneous turn prediction;
performing a 30-Nearest Neighbors algorithm on an entire data set of the new items; and
updating the similar items based on the decision tree.

11. The system of claim 8, wherein defining the target metrics for each of the new items further comprises calculating a weight mean of similarities on the data set of the similar items.

12. The system of claim 8, wherein the turn predictions of the target metrics are obtained by performing linear regression on the data set of the similar items, and wherein the target metrics are dependent variables and the item-based PoS data are predictors.

13. The system of claim 8, wherein the dynamic threshold is 1.2 times of a minimum of the mean errors of the predictions.

14. The system of claim 8, wherein the set of predefined rules comprises Gower's distance measures.

15. A non-transitory computer-readable storage medium having instructions stored which, when executed by a computing device, cause the computing device to perform operations comprising:
aggregating, by a processor of a computing device, sales data of a plurality of items in a category from a database, the items comprising training items and new items, and the sales data of each of the items comprising attributes and an item-based Point-of-Sale (PoS) data;
identifying, by the processor using a set of predefined rules, a data set of similar items on the training items for each of the new items, the set of predefined rules comprising:
a first stage similarity module which performs a K-Nearest Neighbors algorithm on the training items using the attributes and the PoS data, resulting in first-stage nearest items;
a second stage similarity module which performs, after the first stage similarity module:
a 50-Nearest Neighbors algorithm for each item in the first-stage nearest items using the attributes, resulting in attribute-filtered nearest items; and
a 30-Nearest Neighbors algorithm for each item in the attribute-filtered nearest items using the PoS data, resulting in attribute and PoS filtered nearest items; and
a second stage classification module which executes a plurality of simulations on the attribute and PoS filtered nearest items resulting in the data set of similar items, wherein the plurality of simulations comprise performing the 30-Nearest Neighbors algorithm for each of the new items using both the attributes and the POS data;
obtaining target metrics for each of the new items, the target metrics being turn predictions from the data set of the similar items;

calculating mean errors of the turn predictions to identify a set of turn predictions with mean errors lower than a dynamic threshold;

obtaining an ultimate turn prediction for each of the new items by averaging the set of turn predictions; and predicting an average inventory for each of the new items based on the ultimate turn prediction.

16. The non-transitory computer-readable storage medium of claim 15, wherein the instructions cause the computing device to perform further operations comprising:

randomly choose 50% of the new items;

performing the 30-Nearest Neighbors algorithm for each of the randomly chosen new items using both the attributes and the POS data to identify the similar items;

predicting a turn value for each of the new items based on a data set of identified similar items;

comparing the turn value with an observed turn to obtain an error in a turn prediction for each of the new items; and storing the data set of the similar items, their comparison turn values, and the error in turn prediction.

17. The non-transitory computer-readable storage medium of claim 16, wherein the instructions cause the computing device to perform further operations comprising:

creating a decision tree based on comparisons of turn values of the similar items by iterating a number of simulations;

filtering out the similar items which lead to an erroneous prediction;

performing a 30-Nearest Neighbors algorithm on an entire data set of the new items; and updating the similar items based on the decision tree.

18. The non-transitory computer-readable storage medium of claim 15, wherein the obtaining the target metrics for each of the new items further comprises calculating a weight mean of similarities on the data set of the similar items.

19. The non-transitory computer-readable storage medium of claim 15, wherein the turn predictions of the target metrics are obtained by performing linear regression on the data set of the similar items, and wherein the target metrics are dependent variables and the item-based PoS data are predictors.

20. The non-transitory computer-readable storage medium of claim 15, wherein the dynamic threshold is 1.2 times of a minimum of the mean errors of the predictions.

* * * * *